United States Patent
Allen

(10) Patent No.: US 6,701,872 B1
(45) Date of Patent: Mar. 9, 2004

(54) METHOD AND APPARATUS FOR AUTOMATICALLY EXERCISING A CURIOUS ANIMAL

(76) Inventor: Keith H. Allen, 3874 Grove Ave., Palo Alto, CA (US) 94303

( * ) Notice: Subject to any disclaimer, the term of this patent is extended or adjusted under 35 U.S.C. 154(b) by 0 days.

(21) Appl. No.: 10/285,137

(22) Filed: Oct. 30, 2002

(51) Int. Cl.[7] .............................................. A01K 15/02
(52) U.S. Cl. ....................................... 119/707; 362/259
(58) Field of Search ................................ 119/702, 703, 119/704, 705, 707; 362/259

(56) References Cited

U.S. PATENT DOCUMENTS

| | | | |
|---|---|---|---|
| 4,926,438 A | * | 5/1990 | Maes et al. ................. 372/109 |
| 5,443,036 A | | 8/1995 | Amiss et al. |
| 5,934,223 A | * | 8/1999 | Ellery-Guy ................. 119/702 |
| 6,505,576 B2 | * | 1/2003 | Nathanson et al. ......... 119/702 |
| 6,557,495 B2 | * | 5/2003 | Lorenz ....................... 119/707 |

* cited by examiner

Primary Examiner—Charles T. Jordan
Assistant Examiner—Judith A. Nelson
(74) Attorney, Agent, or Firm—Townsend and Townsend and Crew LLP; Kenneth R. Allen

(57) ABSTRACT

An apparatus for exercising a curious animal such as a housecat comprises a laser pointer mounted on a shaft driven by a geared motor mounted on a pedestal. The rotatable shaft is preferably generally vertically disposed and the direction of the pointer is preferably obliquely downward so that activation of the motor causes the spot beam of the laser to track around the pedestal with a vector of motion to attract a cat into interaction with the spot beam. In a further specific embodiment, the laser pointer may be mounted on the head of an oscillatory air circulation fan with a pedestal. The oscillation of the spot beam, together with the air movement of the oscillatory fan, further stimulates activity in a cat while conveniently inducing convective cooling.

14 Claims, 1 Drawing Sheet

METHOD AND APPARATUS FOR AUTOMATICALLY EXERCISING A CURIOUS ANIMAL

BACKGROUND OF THE INVENTION

This invention relates to apparatus for exercising curious animals, especially pet cats. This invention is an improvement over the invention described in U.S. Pat. No. 5,443,036 issued Aug. 2, 1995. Laser pointers are known and in particular it is known that cats are attracted by and stalk the spot of a laser pointed in their vicinity. It is also known that cats are attracted to the air movement of a fan, often to be cooled by such air movement. Heretofore the method for inducing exercise in a cat has been to manually move the spot beam in an arbitrary manner to stimulate exercise.

It has been found that the prior art exercise method is limited my the need for manual intervention, which may not always be desirable. An example is in a cage in a zoo, where large curious animals may need exercise. What is needed is an exercise apparatus which eliminates the need for manual intervention.

SUMMARY OF THE INVENTION

According to the invention, an apparatus for exercising a curious animal such as a pet housecat comprises a laser pointer mounted on a shaft driven by a motor mounted on a pedestal. The rotatable shaft is preferably vertically disposed and the direction of the pointer is preferably obliquely downward so that activation of the motor causes the spot beam of the laser to track a vector of motion to attract a cat into interaction with the spot beam. In a further specific embodiment, the laser pointer may be mounted on the head of an oscillatory air circulation fan with a pedestal. The oscillation of the spot beam, together with the air movement of the oscillatory fan, further stimulates activity in a cat while conveniently inducing convective cooling.

The invention will be better understood by reference to the following detailed descriptions in connection with the accompanying drawings.

DESCRIPTION OF THE SPECIFIC EMBODIMENTS

Figure 1:
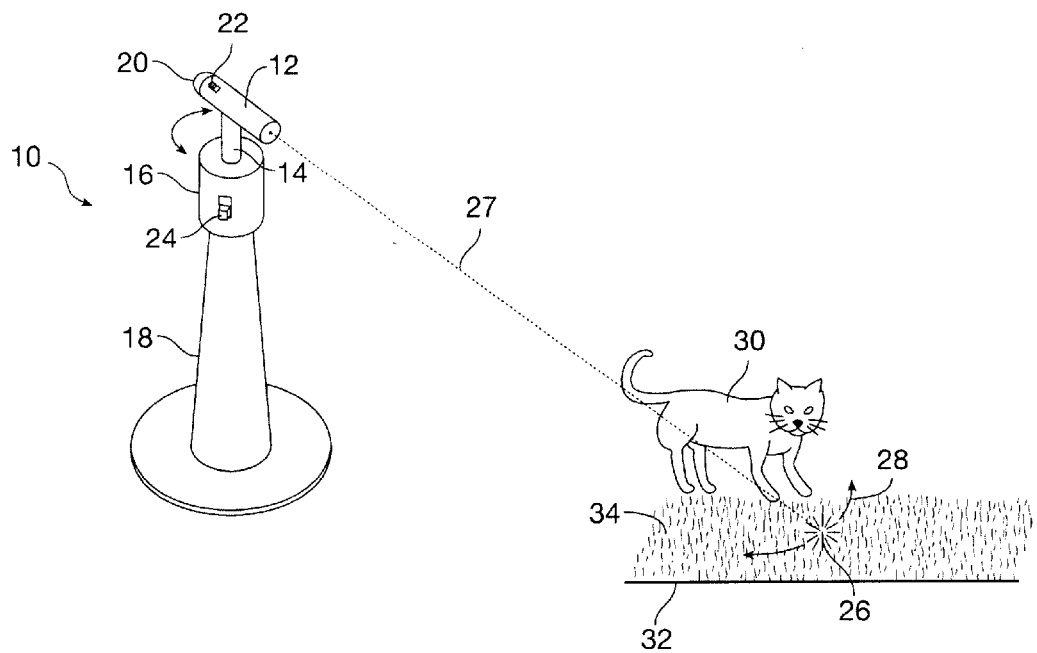
FIG. 1 is a depiction of a first embodiment of an apparatus according to the invention.

Referring to FIG. 1, an apparatus 10 according to the invention is shown. The apparatus 10 comprises a laser pointer 12 mounted on a rotatable shaft 14 driven by a motor 16 mounted on a pedestal 18, which may rest on the floor as shown or be mounted to a ceiling or wall. The laser pointer 12 has a self-contained power supply 20 and an on/off switch 22. A laser pointer is particularly appropriate as a source of production of the exercise object, a spot 26, since the coherent nature of the light and the substantially colinear beam produce a characteristic animated speckel effect which does not substantially grow or shrink, nor increase or decrease in intensity, with distance from the source. The rotatable shaft 14 is preferably vertically disposed and the direction of the pointer 12 is preferably obliquely downward so that activation of the motor 16 by means of a power switch 24 and external or internal power causes the beam spot 26 of the laser pointer 12 to track around an arc or along a vector 28 of motion such as around the pedestal 18 on the floor to attract a curious animal 30 such as a pet housecat into interaction with the moving spot 26. Depending upon the terrain impinged upon by the beam 27 producing the spot 26, such as a carpet 32 or the like with a fabric pile 34, or even grass, the scattering of light of the beam 27 will effect animation of greater or lesser reflectivity with motion of the spot 26 along the vector 28. This animation attracts and engages the curious animal 30 as it stalks and attempts to restrain the animated spot 26, an impossible task. An extremely curious and persistent animal may spend hours at a time in this exercise, and this resultant exercise benefits the otherwise inactive animal without need for manual intervention to effect the motion of the spot 26.

Figure 2:
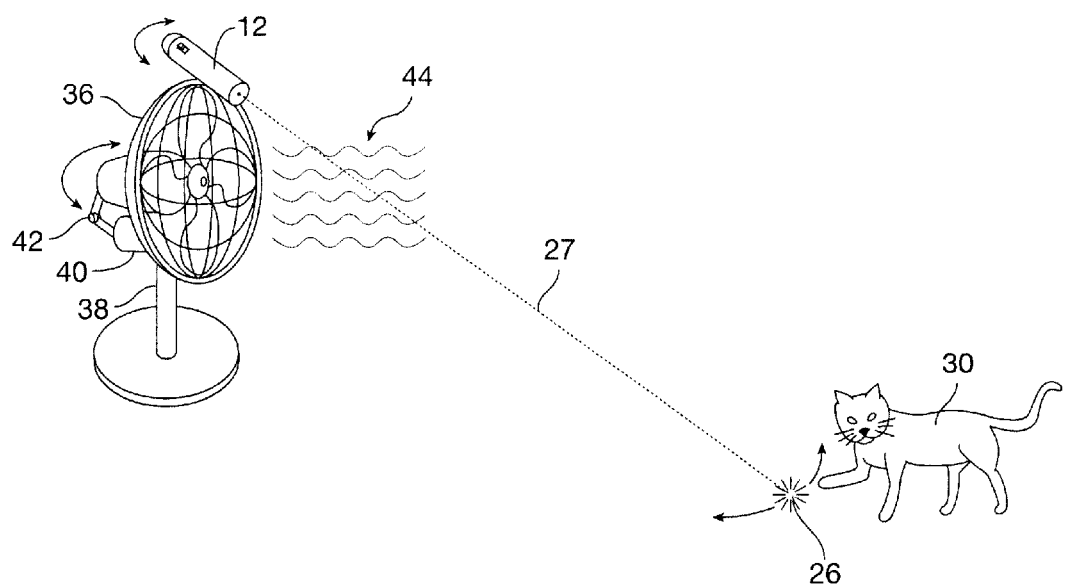
FIG. 2 is a depiction of a second embodiment of an apparatus according to the invention.

Referring to FIG. 2, in a further specific embodiment, the laser pointer 12 may be mounted on the head of an oscillatory air circulation fan 36 on an appropriate pedestal 38. A motor 40 causes an eccentric cam and linkage assembly 42 to oscillate the fan assembly 36 about a pivot of the pedestal 38. The reciprocal oscillations of the beam 27, together with the air movement 44 of the oscillatory fan 36, cause the spot 26 to track back and forth along a vector, often staying in close range of the curious animal 30. The spot motion and air movement further stimulates activity in the animal 30 while conveniently inducing convective cooling, providing potential relief and improved comfort for a fur-clad feline or the like, especially in a warm and/or humid environment.

The invention has been explained with reference to specific embodiments. Other embodiments will be apparent to those of ordinary skill in the art. For example, the pedestal mount can be a ceiling or wall mount. It is therefore not intended that this invention be limited, except as indicated by the appended claims.

What is claimed is:

1. An apparatus for exercising a curious animal comprising:
   a pedestal;
   a motor having a shaft, said motor being mounted to the pedestal; and
   a laser pointer producing a spot beam and mounted on said shaft to project the spot beam from the pedestal, said motor causing said shaft to oscillate so that said spot beam tracks about said pedestal with a vector of motion to attract the curious animal into interaction with the spot beam.

2. The apparatus according to claim 1 wherein said shaft is generally vertically disposed.

3. The apparatus according to claim 2 wherein motion of said shaft invokes complete rotation of said spot beam.

4. The apparatus according to claim 1 wherein motion of said shaft invokes complete rotation of said spot beam.

5. The apparatus according to claim 1 wherein the rotatable shaft is preferably generally vertically disposed and the disposition of the laser pointer is preferably obliquely downward so that activation of the motor causes the spot beam to track around the pedestal.

6. An apparatus for exercising a curious animal comprising:
   a pedestal;
   a motor having a shaft, said motor being mounted to the pedestal;
   a laser pointer producing a spot beam and mounted on said shaft to project the spot beam from the pedestal, said motor causing said shaft to oscillate so that said spot beam tracks about said pedestal with a vector of motion to attract the curious animal into interaction with the spot beam; and an oscillatory air circulation fan on a head, wherein said motor is mounted to provide oscillatory motion of said head, and wherein said laser pointer is mounted to said head such that said motor induces oscillation of the spot beam about said pedestal, together with the air movement of the oscillatory fan to stimulate activity in a cat while conveniently inducing convective cooling.

7. A method for automatically exercising a curious animal comprising:

providing a laser spot beam from a fixed location to an exercise area;

causing said spot beam to move under automatic action of a motor with a vector of motion to induce interaction of the curious animal with the spot beam.

8. A method for automatically exercising a curious animal comprising:

providing a laser spot beam from a fixed location to an exercise area;

causing said spot beam to move under automatic action of a motor with a vector of motion to induce interaction of the curious animal with the spot beam; and causing air to be blown from a fan moveably mounted to said motor to stimulate the cat and to provide convective cooling to the curious animal.

9. An apparatus for exercising a curious animal comprising:

a portable pedestal capable of arbitrary deployment;

a motor directly driving a movable shaft, said motor being mounted to the portable pedestal; and a laser pointer producing a spot beam and mounted fixedly with respect to said movable shaft to project the spot beam from the pedestal, said motor causing said shaft to oscillate so that said laser pointer oscillates and said spot beam tracks about said pedestal with a vector of motion to attract the curious animal into interaction with the spot beam.

10. The apparatus according to claim 9 wherein said shaft is generally vertically disposed.

11. The apparatus according to claim 10 wherein motion of said shaft invokes complete rotation of said spot beam.

12. The apparatus according to claim 9 wherein motion of said shaft invokes complete rotation of said spot beam.

13. The apparatus according to claim 9 wherein the rotatable shaft is preferably generally vertically disposed and the disposition of the laser pointer is preferably obliquely downward so that activation of the motor causes the spot beam to track around the pedestal.

14. A method for automatically exercising a curious animal comprising:

providing a laser spot beam from a rotating laser source mounted directly on a shaft driven directly by a motor mounted on a portable pedestal; and causing said spot beam to move under automatic action of said motor directly driving said shaft to which said laser source is directly mounted with a vector of motion to induce interaction of the curious animal with the spot beam in an exercise area.

* * * * *